United States Patent [19]

Hammer et al.

[11] Patent Number: 4,699,972

[45] Date of Patent: Oct. 13, 1987

[54] ALIPHATIC POLYESTERS CONTAINING SULPHUR, AND THEIR USE AS STABILIZERS FOR POLYMERS

[75] Inventors: Heinz Hammer, Cologne; Herbert Eichenauer, Dormagen; Ernst Roos, Odenthal; Eberhard Jürgens, Cologne, all of Fed. Rep. of Germany

[73] Assignee: Bayer Aktiengesellschaft, Leverkusen-Bayerwerk, Fed. Rep. of Germany

[21] Appl. No.: 899,506

[22] Filed: Aug. 22, 1986

[30] Foreign Application Priority Data

Sep. 4, 1985 [DE] Fed. Rep. of Germany ....... 3531497

[51] Int. Cl.$^4$ .................... C08G 63/68; C08G 63/04
[52] U.S. Cl. .................... 528/293; 524/303; 524/304; 528/279; 528/283; 528/294; 560/147; 560/154; 562/594
[58] Field of Search ............... 524/303, 304; 528/279, 528/283, 293, 294; 560/147, 154; 562/594

[56] References Cited

U.S. PATENT DOCUMENTS

| | | | |
|---|---|---|---|
| 2,530,872 | 11/1950 | Gregory et al. | 524/303 |
| 3,344,113 | 9/1967 | Alheim et al. | 524/303 |
| 3,590,056 | 6/1971 | Tholstrup et al. | 524/303 |
| 4,028,305 | 6/1977 | Li et al. | 528/294 |
| 4,091,002 | 5/1978 | Li et al. | 528/294 |
| 4,321,191 | 3/1982 | Minagawa et al. | 524/285 |
| 4,595,721 | 6/1986 | Devaux et al. | 524/160 |
| 4,657,957 | 4/1987 | Devaux et al. | 524/105 |

*Primary Examiner*—Lucille M. Phynes
*Attorney, Agent, or Firm*—Connolly & Hutz

[57] ABSTRACT

Aliphatic polyesters containing sulphur, which contain the sulphur as structural units in the form of sulphide or disulphide groups in both the acid component and the diol component, a process for the preparation of these polyesters, and also polymers containing these polyesters.

6 Claims, No Drawings

ALIPHATIC POLYESTERS CONTAINING SULPHUR, AND THEIR USE AS STABILIZERS FOR POLYMERS

The invention relates to aliphatic polyesters containing sulphur, which contain the sulphur as structural units in the form of sulphide or disulphide groups in both the acid component and the diol component, a process for the preparation of these polyesters, and also polymers containing these polyesters.

Under the action of oxygen, heat or light, synthetic polymers, particularly polymers having unsaturated bonds in the molecular chain, are subject to degradation reactions which result in a deterioration in their properties and to problems in the practical use of components produced from the polymers.

Numerous stabilizers for polymers have already been suggested for the prevention of degradation effects of this type, inter alia also combinations of sterically hindered phenols and sulphur-containing compounds.

The concomitant use of sulphur-containing polyesters in the stabilization of synthetic polymers by means of sterically hindered phenols is also known (see U.S. Pat. No. 4,321,191 and the literature quoted therein).

It has been found that polyesters of particularly good effectiveness as co-stabilizers, while having good compatibility with polymers and a low volatility, are obtained from aliphatic, sulphur-containing dicarboxylic acids (esters) of the formula (I) and cycloaliphatic, sulphur-containing diols of the formula (II).

$$RO-\overset{O}{\underset{\|}{C}}-[(CH_2)_a-(S)_b-(CH_2)_c-(S)_d-(CH_2)_e]_f-\overset{O}{\underset{\|}{C}}-OR^1 \quad (I)$$

R and R' = H or $C_1$-$C_4$-alkyl,
a = 1, 2 or 3
b and d = 0, 1 or 2, but not both 0,
c = 0, 1, 2 or 3 and
e and f = 1, 2 or 3

(II) [cycloaliphatic diol structure with $R^2$, $R^3$ substituents and two -S-CH$_2$CH$_2$-OH groups]

$R^2$ and $R^3$ = H or $C_1$-$C_4$-alkyl.

The invention relates to sulphur-containing, aliphatic polyesters which have been built up from dicarboxylic acids (esters) of the formula I and diols of the formula II and which have a molecular weight of 500–7,000.

The invention also relates to sulphur containing polyesters which are prepared by polycondensation from sulphur-containing dicarboxylic acids or dicarboxylic acid esters of the formula (I) and sulphur containing diols of the formula (II), the dicarboxylic acid (ester)-:diol molar ratio being 5:1 to 1:5, preferably 3:1 to 1:3 and particularly preferably 2:1 to 1:2. In the formulae (I) and (II), R, $R^1$, $R^2$, and $R^3$ independently of one another denote hydrogen or an alkyl radical having 1 to 4 carbon atoms, a = 1, 2 or 3, b and d = 0, 1 or 2, but are not both 0 at the same time, c = 0, 1, 2 or 3 and e and f = 1, 2 or 3.

The following are preferred dicarboxylic acids (esters):

$$RO-\overset{O}{\underset{\|}{C}}-CH_2CH_2-S-CH_2-S-CH_2CH_2-\overset{O}{\underset{\|}{C}}-OR^1 \quad (III)$$

$$RO-\overset{O}{\underset{\|}{C}}-CH_2-S-CH_2-\overset{O}{\underset{\|}{C}}-OR^1 \quad (IV)$$

$$RO-\overset{O}{\underset{\|}{C}}-CH_2CH_2-S-CH_2CH_2-\overset{O}{\underset{\|}{C}}-OR^1 \quad (V)$$

$$RO-\overset{O}{\underset{\|}{C}}-CH_2-S-S-CH_2-\overset{O}{\underset{\|}{C}}-OR^1 \quad (VI)$$

$$RO-\overset{O}{\underset{\|}{C}}-CH_2CH_2-S-CH_2CH_2-S-CH_2CH_2-\overset{O}{\underset{\|}{C}}-OR^1 \quad (VII)$$

and $$RO-\overset{O}{\underset{\|}{C}}-CH_2CH_2-S-S-CH_2CH_2-\overset{O}{\underset{\|}{C}}-OR^1 \quad (VIII)$$

wherein R and $R^1$ have the meaning mentioned above.

The following are preferred diol components:

(IX) [cyclohexane ring with isopropyl substituent and two -S-CH$_2$CH$_2$-OH groups]

and (X) [HO-CH$_2$CH$_2$-S-CH$_2$CH$_2$-cyclohexane-S-CH$_2$CH$_2$-OH structure]

The sulphur-containing polyesters can be prepared by mixing the diol and the dicarboxylic acid (ester) and subjecting the mixture to polycondensation until the desired molecular weight has been reached. Monofunctional carboxylic acids (esters) or monofunctional alcohols can be added as molecular weight regulators in this reaction. The condensation temperatures are 50° C. to 250° C., preferably 60° C. to 200° C., and particularly preferably 70° C. to 180° C. Customary catalysts, for example acids such as ptoluenesulphonic acid, or bases, such as metal alcoholates or organometallic compounds of titanium, tin or other transition metals, are used for the condensation reaction.

The resulting sulphur-containing, aliphatic polyesters have molecular wieghts (determined via the OH number or vapour pressure osmometry measurements) of 500–7,000, preferably 700–2,500.

The sulphur-containing polyesters are suitable for use as co-stabilizers in the stabilization of synthetic polymers by sterically hindered phenols. They display a particular effectiveness in the stabilization of rubber grades, for example polybutadiene, polyisoprene, polychloroprene, styrene/butadiene copolymers, acrylonitrile/butadiene copolymers, acrylic rubbers, ethylene-/propylene rubbers or EPDM rubbers (ethylene-/propylene/diene rubbers containing, as the diene, small amounts of an unconjugated diene, such as, for example, 1,5-hexadiene or norbornadiene), of thermoplastics, for example polyethylene, polypropylene, polystyrene, polymethylmethacrylate, styrene/acrylonitrile copolymers, polycarbonate, polyamide or polyesters, and particularly of rubber-mocified thermoplastics, for example acylonitrile/butadiene/styrene terpolymers (ABS), methyl methacrylate/butadiene/styrene terpolymers (MBS), high-impact polystyrene (HIPS) or ABS/polycarbonate mixtures.

The polyesters can be combined, for the stabilization of polymers, with any sterically hindered phenols which cna be employed as antioxidants. The following are examples of suitable sterically hindered phenols: 2,6-di-tert.-butyl-4-methylphenol, octadecyl-3-(3′,5′-ditert.-butyl-4′-hydroxyphenyl) propionate, pentaerythritol tetrakis-[3-(3′,5′-ditert.-butyl-4′-hydroxyphenyl)-propionate.]and 2,2′-thiodiethryl bis-[3-(3′,5′-ditert.-butyl-4′-hydroxyphenyl)-propionate].

In general, 0.01 to 5 parts by weight, preferably 0.05 to 3 parts by weight and particularly preferably 0.1 to 2.5 parts by weight, of polyester are added (in each case relative to 100 parts by weight of polymer to be stabilized).

In this stabilization, the sulphur-containing, aliphatic polyesters can be added to the polymer material in a solid form, as a solution or in the form of a dispersion or emulsion. Depending on the form of the polymer to be stabilized, incorporation is carried out on kneaders, rolls, in an emulsion or in solution.

EXAMPLES AND COMPARISON EXAMPLES

Parts are parts by weight in all cases.

EXAMPLE 1

Preparation of the polyester formed from 1-methyl-2-(hydroxyethylthio)-4-[1-methyl-2-(2-hydroxyethylthio)-ethyl]-cyclohexane (diol A) and dimethyl thiodipropionate.

134 g (0.65 mol) of dimethyl thiodipropionate and 116 g (0.4 mol) of diol A, together with 0.2 ml of titanium tetrabutylate, are heated at 160° C. for 20 hours under N2. The methanol formed is collected in a cooled receiver. After cooling, the product is taken up in 500 ml of toluene and washed twice with water. The solvent is removed by vacuum distillation. The residue is incipiently distilled under a vacuum of 0.1 mbar until a temperature of 220° C. has been reached, in order to remove the volatile constituents. This leaves a yellow oil. Its average molecular weight is 1,130.

EXAMPLE 2

103 g (0.5 mol) of dimethyl thiodipropionate and 146 g (0.5 mol) of diol A are reacted as in Example 1. The resulting polyester has an average molecular weight of 2,440.

EXAMPLE 3

112 g (0.5 mol) of dimethyl 2,2′-[methylenebis(thio)]-bisacetate and 190 g (0.65 mol) of diol A are reacted analogously to Example 1 to give a polyester having an average molecular weight of 1,155.

EXAMPLE 4

The polyester formed from 1-[2-(2-hydroxyethylthio)ethyl]-3-or -4-(2-hydroxyethylthio)-cyclohexane (diol B) and dimethyl thiodipropionate.

82 g (0.4) mol of dimethyl thiodipropionate and 80 g (0.3 mol) of diol B are subjected to condensation to give the polyester, as indicated in Example 1. Average molecular weight: 1,790.

EXAMPLE 5

110 g (0.5 mol) of dimethyl 2,2′-dithiobisacetate and 132 g (0.5 mol) of diol B, together with 0.2 ml of titanium tetrabutylate, are heated at 150°–155° C. for 12 hours under 300 mbar. 500 ml of toluene are added, and the solution is washed twice with water. The solvent is removed and the residue is heated under a vacuum of 0.1 mbar until a bath temperature of 220° C. has been reached, in order to remove the volatile constituents. The remaining yellowish oil has an average molecular weight of 700.

EXAMPLE 6

112 g (0.5 mol) of dimethyl 2,2′-[methylenebis(thio)]-bisacetate and 132 g ( 0.5 mol) of diol B are reacted analogously to Example 5 to give a yellowish polyester having an average molecular weight of 3,862.

EXAMPLE 7

Testing effectiveness in polypropylene

Commercially available polypropylene granules are extracted with methylene cholride in a Soxhlet apparatus for 8 hours in order to remove the stabilizer present. the material is then dried in vacuo for 12 hours.

The stabilizer mixtures to be tested are incorporated in the melt at 200° C. for 4 minutes in a Laboratory kneader. The polypropylene is then compression-moulded to give sheets 0.5 mm thick (pre-forming for 7 minutes at 200° C. and 10 bar and for 1.5 minutes at 200° C. and 200 bar and cooling under pressure for 10 minutes. Triplicate groups are stored in a circulating air cabinet at 150° C. The time required for oxidative destruction (brown colouration and embrittlement) to set in is measured.

In each case 0.3% by weight of the co-stabilizers according to the invention was used. The phenolic antioxidant concomitantly used was pentaerythritol tetrakis-3-(3′,5′-ditert.-butyl-4′-hydroxyphenyl)-propionate (Irganox 1010, Ciba Geigy), 0.1% in each case. The results of the ageing tests are shown in Table 1.

TABLE 1

| Co-stabilizer | Phenolic antioxidant | Time required for destruction/days |
|---|---|---|
|  | 0.1% by weight | 25 |
| 0.3% by weight of dilauryl thiodipropionate | 0.1% by weight | 32 |
| 0.3% by weight of polyester from Example |  |  |
| 2 | 0.1% by weight | 37 |
| 3 | 0.1% by weight | 38 |
| 5 | 0.1% by weight | 38 |
| 6 | 0.1% by weight | 31 |

EXAMPLE 8

Preparation of a stabilizer dispersion using the sulphur-containing, aliphatic polyester from Example 2.

A hot solution of 40 parts of a nonionic emulsifier (ethoxylated nonylphenol) in 365 parts of water is added to a melt of 35 parts of the polyester from Example 2 and 100 parts of octadecyl 3-(3',5'-ditert.-butyl-4'-hydroxyphenyl)-propionate (Irganox 1076, Ciba Geigy) with vigorous stirring (Ultraturrax), and stirring is continued until a stable dispersion has been formed.

EXAMPLE 9 (COMPARISON)

Preparation of a stabilizer dispersion using a conventional sulphur-containing synergist.

A hot solution of 40 parts of a nonionic emulsifier (ethoxylated nonylphenol) in 470 parts of water is added to a melt of 70 parts of dilauryl thiodipropionate Irganox PS 800, Ciba Geigy) and 100 parts of octadecyl 3-(3',5'-ditert.-butyl-4'-hydroxyphenyl)-propionate (Irganox 1076, Ciba Geigy) with vigorous stirring (Ultraturrax), and stirring is continued until a stable dispersion has been formed.

EXAMPLE 10

The use of a sulphur-containing, aliphatic polyester as a co-stabilizer for stabilizing ABS.

4 parts (relative to graft rubber solids) of the stabilizer dispersion from Example 8 were added to 100 parts of a graft rubber prepared by emulsion polymerization of a mixture consisting of 36 parts by weight of styrene and 14 parts by weight of acrylonitrile in the presence of 50 parts by weight of a grade of polybutadiene, present in the form of latex, having an average particle size of 0.3 μm, determined by light scattering. After being stirred for two hours, the latex was coagulated, using a 1% strength aqueous solution of a 1:1 mixture of acetic acid and magnesium sulphate, and the coagulate was dried in vacuo at 70° C. The heat stability of the powder, which had a particle size of 1 to 0.1 mm, was investigated by dynamic DSC measurements, using a Perkin-Elmer DSC-2 measuring apparatus (scavenging gas: oxygen at 3.6 L/hour; heating rate: 20 K/minute): the exothermic reaction began at T=220° C.

EXAMPLE 11 (COMPARISON)

The use of dilauryl thiodipropionate as a co-stabilizer for stabilizing ABS.

4 parts (relative to graft rubber solids) of the stabilizer dispersion from Example 9 were added to the graft rubber latex described in Example 10, and the latter was converted into a dry powder as described in Example 10. Dynamic DSC measurements (conditions as in Example 10): exothermic reaction started at T=212° C.

We claim:

1. Sulphur-containing, aliphatic polyesters which have been built up from dicarboxylic acids (esters) of the formula (I) and diols of the formula (II)

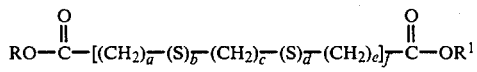

(I)

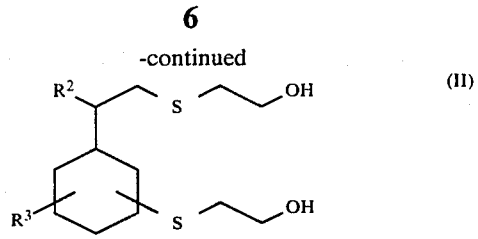

(II)

wherein
R, $R^1$, $R^2$ and $R^3$ independently of one another denote hydrogen or an alkyl radical having 1 to 4 carbon atoms,
a denotes 1, 2 or 3,
b and d denote 0, 1 or 2 or 3 and
e and f denote 1, 2 or 3,
and which have a molecular weight of 500 to 7,000.

2. Sulphur-containing, aliphatic polyesters according to claim 1, in which the diol is one of the compounds

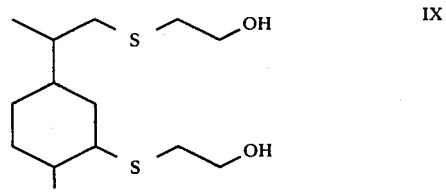

IX and

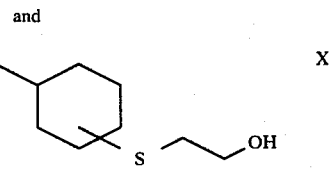

X or a mixture of these compounds.

3. Sulphur-containing, aliphatic polyesters according to claim 1, in which the dicarboxylic acid (ester) is one of the compounds

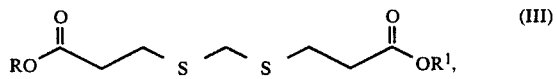

(III)

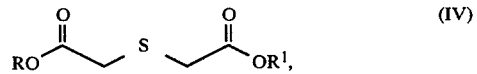

(IV)

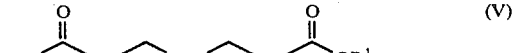

(V)

and

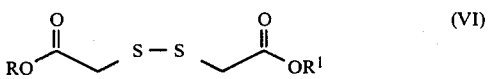

(VI)

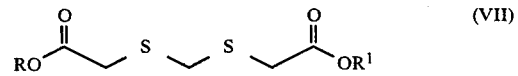

(VII)

and

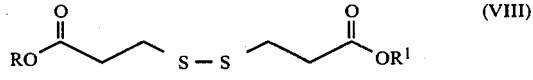

(VIII)

or mixtures thereof wherein R and $R^1$ denote hydrogen or alkyl groups having 1 to 4 carbon atoms.

4. Process for the preparation of sulphur-containing, aliphatic polyesters according to claim 1, characterized in that dicarboxylic acids (esters) (I) and a diol (II) are mixed and are subjected to polycondensation at 50°–250° C., if appropriate in the presence of a catalyst, until a molecular weight of 500 to 7000 has been reached.

5. Process according to claim 4, characterized in that diols of the formulae

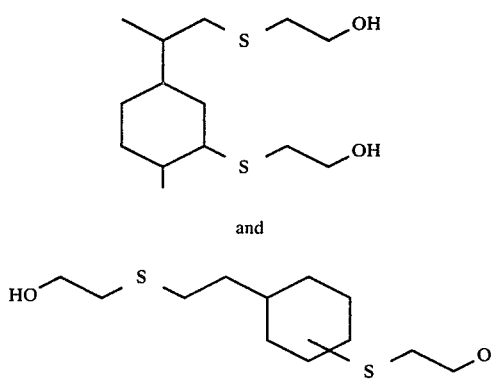

or mixtures thereof and a dicarboxylic acid (ester) of the formulae

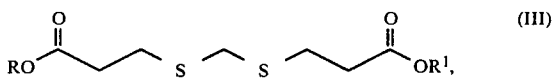 (III)

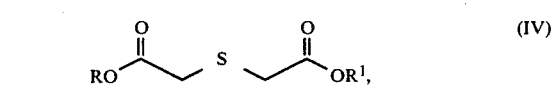 (IV)

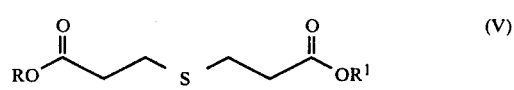 (V)

and

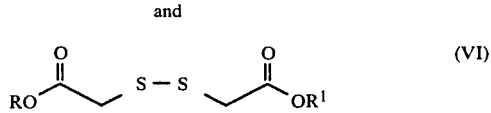 (VI)

wherein R and R' denote hydrogen or $C_1$–$C_4$-alkyl, or mixtures thereof, are employed.

6. Synthetic polymers, in particular thermoplastic moulding compositions, characterized in that they contain 0.1 to 5% by weight of a polyester according to claim 1.

* * * * *